(12) United States Patent
Li et al.

(10) Patent No.: US 11,221,851 B2
(45) Date of Patent: Jan. 11, 2022

(54) METHOD EXECUTED BY COMPUTING DEVICE, APPARATUS, DEVICE AND COMPUTER-READABLE STORAGE MEDIUM

(71) Applicant: BEIJING BAIDU NETCOM SCIENCE AND TECHNOLOGY CO., LTD., Beijing (CN)

(72) Inventors: Huimin Li, Beijing (CN); Peng Wu, Beijing (CN); Jian Ouyang, Beijing (CN)

(73) Assignees: BEIJING BAIDU NETCOM SCIENCE AND TECHNOLOGY CO., LTD., Beijing (CN); KUNLUNXIN TECHNOLOGY (BEIJING) COMPANY LIMITED, Beijing (CN)

( * ) Notice: Subject to any disclaimer, the term of this patent is extended or adjusted under 35 U.S.C. 154(b) by 0 days.

(21) Appl. No.: 16/936,676

(22) Filed: Jul. 23, 2020

(65) Prior Publication Data

US 2021/0026630 A1 Jan. 28, 2021

(30) Foreign Application Priority Data

Jul. 25, 2019 (CN) .......................... 201910677739.9

(51) Int. Cl.
*G06F 9/30* (2018.01)
*G06F 9/445* (2018.01)
*G06F 9/54* (2006.01)

(52) U.S. Cl.
CPC ...... *G06F 9/30036* (2013.01); *G06F 9/30189* (2013.01); *G06F 9/44505* (2013.01); *G06F 9/546* (2013.01)

(58) Field of Classification Search
None
See application file for complete search history.

(56) References Cited

U.S. PATENT DOCUMENTS

| 2002/0133688 A1* | 9/2002 | Lee ..................... G06F 15/8023 |
| | | 712/22 |
| 2004/0193837 A1* | 9/2004 | Devaney ............ G06F 9/30141 |
| | | 712/3 |

(Continued)

FOREIGN PATENT DOCUMENTS

| EP | 3531348 A1 | 8/2019 |
| JP | S59114677 A | 7/1984 |

(Continued)

OTHER PUBLICATIONS

Extended European Search Report for EP Application No. 20165644.4, dated Dec. 22, 2020, 8 pages.

(Continued)

*Primary Examiner* — Eric Coleman
(74) *Attorney, Agent, or Firm* — Fay Sharpe LLP (57) ABSTRACT

Embodiments of the present disclosure provide a method, executed by a computing device, for configuring a vector operation, an apparatus, a device, and a storage medium. The method includes obtaining information indicating at least one configurable vector operation parameter. The information indicating the at least one configurable vector operation parameter indicates a type and a value of the configurable vector operation parameter. The method further includes: based on the type and the value of the configurable vector operation parameter, configuring multiple vector operation circuits to enable each of the vector operation circuits to execute a target vector operation including two or more basic vector operations and defined based on the type and value of the configurable vector operation parameter.

18 Claims, 3 Drawing Sheets

(56) References Cited

U.S. PATENT DOCUMENTS

| | | | |
|---|---|---|---|
| 2009/0106341 A1* | 4/2009 | Al Adnani | G06F 15/7867 |
| | | | 708/404 |
| 2011/0219207 A1* | 9/2011 | Suh | G06F 9/22 |
| | | | 712/7 |
| 2012/0260061 A1* | 10/2012 | Reid | G06F 9/30036 |
| | | | 712/3 |
| 2013/0297043 A1* | 11/2013 | Choi | H03K 19/17752 |
| | | | 700/3 |
| 2018/0189424 A1 | 7/2018 | Boesch et al. | |
| 2018/0329868 A1* | 11/2018 | Chen | G06F 9/30036 |
| 2019/0384606 A1* | 12/2019 | Panda | G06F 9/3891 |

FOREIGN PATENT DOCUMENTS

| | | | |
|---|---|---|---|
| JP | H02176971 A | 7/1990 |
| JP | H04181373 A | 6/1992 |
| JP | H09185602 A | 7/1997 |

OTHER PUBLICATIONS

Office Action for JP application No. 2020-108978, dated Jul. 6, 2021, 3 pages.

English translation of Office Action for JP application No. 2020-108978, dated Jul. 6, 2021, 3 pages.

* cited by examiner

METHOD EXECUTED BY COMPUTING DEVICE, APPARATUS, DEVICE AND COMPUTER-READABLE STORAGE MEDIUM

CROSS REFERENCE TO RELATED APPLICATIONS

This application claims priority and benefits to Chinese Application No. 201910677739.9, filed on Jul. 25, 2019, the entire content of which is incorporated herein by reference.

TECHNICAL FIELD

The present disclosure relates to a computer field, and more particularly, to a method for configuring vector operation executed by a computing device, a vector operation method executed by a computing device, an apparatus, a device, and a computer-readable storage medium.

BACKGROUND

With the development of artificial intelligence (AI) technology, a field of deep learning becomes a hotspot of current research. In the deep learning, a large number of vector operations are used. Hardware (for example, graphics processors (CPUs) or some application-specific custom integrated circuits (ASICs)) related to the deep learning have been developed.

SUMMARY

Embodiments of the present disclosure provide a method, executed by a computing device, for configuring vector operations. The method includes: obtaining information indicating at least one configurable vector operation parameter, in which the information indicating the at least one configurable vector operation parameter indicates a type and value of the configurable vector operation parameter; and based on the type and value of the configurable vector operation parameter, configuring a plurality of vector operation units to enable each of the vector operation units to execute a target vector operation comprising two or more basic vector operations defined based on the type and value of the configurable vector operation parameter.

Embodiments of the present disclosure provide a device, executed by a computing device, for configuring vector operation. The device includes: a controller, configured to obtain information indicating at least one configurable vector operation parameter, wherein the information indicating the at least one configurable vector operation parameter indicates a type and value of the configurable vector operation parameter; and a computing unit configured to configure a plurality of the vector operation units based on the type and value of the configurable vector operation parameter to enable each of the vector operation units to execute a target vector operation comprising two or more basic vector operations defined based on the type and value of the configurable vector operation parameter.

Embodiments of the present disclosure provide a computer readable storage medium having a computing program stored thereon. When the program is executed by a processor, a method for configuring a vector operation is implemented. The method includes: obtaining information indicating at least one configurable vector operation parameter, in which the information indicating the at least one configurable vector operation parameter indicates a type and value of the configurable vector operation parameter; and based on the type and value of the configurable vector operation parameter, configuring a plurality of vector operation units to enable each of the vector operation units to execute a target vector operation comprising two or more basic vector operations defined based on the type and value of the configurable vector operation parameter.

It should be understood that the content described in the summary section is not intended to limit key or important features of embodiments of the present disclosure, nor is it intended to limit the scope of the present disclosure. Additional features of the present disclosure will become readily understood from the following description.

BRIEF DESCRIPTION OF THE DRAWINGS

With reference to the attached drawings and the following detailed description, the above and additional features, advantages, and aspects of embodiments of the present disclosure will become more apparent. In the drawings, the same or similar elements are denoted by like reference numerals throughout the descriptions, in which.

DETAILED DESCRIPTION

The present disclosure will be described in detail below with reference to the drawings. The drawings show embodiments of the present disclosure. However, it should be understood, the present disclosure can be implemented in many different forms and is not limited to embodiments described herein. Rather, these embodiments are provided to for thorough and comprehensive understanding the present disclosure. It should be understood that embodiments described herein with reference to drawings are explanatory, and shall not be construed to limit the protection scope of the present disclosure.

In descriptions of embodiments of the present disclosure, the term "including" and similar terms should be understood as inclusive, that is, "including but not limited to". The term "based on" should be understood as "based at least in part on". The term "one embodiment" or "the embodiment" should be understood as "at least one embodiment". The terms such as "first", and "second" may refer to different objects or the same object. Additional explicit and implicit definitions may be included below.

As used herein, the term "basic vector operation" refers to a basic operation unit of the vector operation, for example, an arithmetic operation (i.e., addition, subtraction, multiplication, and division) between two vectors, and an operation between a vector and a scalar (such as multiplication between the scalar and the vector). As an illustrative and non-limiting example, for two input vectors both having lengths of n, i.e., a=[a1, a2, a3, . . . , an] and b=[b1, b2, b3, . . . , bn], the vector addition between a and b may be defined as a+b=[a1+b1, a2+b2, a3+b3, . . . , an+bn], the vector subtraction between a and b may be defined as: a−b=[a1−b1, a2−b2, . . . , an−bn], the vector multiplication between a and b may be defined as: a*b=[a1*b1, a2*b2, . . . , an*bn], and the vector division between a and b may be defined as: a/b=[a1/b1, A2/b2, . . . an/bn]. In addition, as an illustrative and non-limiting example, for an input vector having the length of n, i.e., a=[a1, a2, a3, . . . , an], the multiplication operation between the vector and a scalar A may be defined as a*A=[A*a1, A*a2, . . . , A*an]. A combination of one or more basic vector operations may form a composite vector operation. In the present disclosure, the term "vector operation" means the "composite vector operation", unless otherwise specified.

As used herein, the term "vector operation unit" used herein refers to a computing unit that may implement the vector operation in a computing device, which can be implemented by hardware (for example, multiple electrical components) or by software. In some application scenarios, the vector operation unit may be integrated on a chip (e.g., CPU, GPU, ASIC, etc.).

Although this hardware supports vector operations, these vector operations supported need to be further improved in execution performance and flexibility of vector operations. Therefore, how to improve the execution performance and flexibility of the vector operations to meet requirements of the deep learning technology is a problem that needs to be solved urgently.

As discussed above, how to improve performance and flexibility of implementing the vector operation is a problem that needs to be solved. A conventional solution, executed by a computing device, of the vector operation is to implement the vector operation by controlling a processing unit (CPU). In this solution, the CPU is usually designed to perform calculations of scalars. Therefore, it needs to divide the vector operation into multiple calculations of scalars, resulting in long length of an vector operation instruction inputted. During the execution of the vector operation, many control instructions (for example, branch jump instructions) may be used to control a loop judgment, leading to a low overall execution performance of the vector operation.

Another conventional solution, executed by a computing device, of the vector operation is implemented using a GPU or a CPU with a single instruction multiple data (SIMD) function. In this technology, the performance of the vector operation may be improved to a certain degree. However, the inventor noticed that this solution still has many defects, mainly including the following.

1) On-chip cache space is limited. During the execution of the vector operation, data needs to be frequently moved from an off-chip memory. Especially for a large-scaled vector operation, bandwidth of the off-chip memory makes the execution performance of the vector operation low.

2) Only basic vector operations are supported. A complex vector operation including multiple basic vector operations needs to be further divided into multiple basic vector operation instructions, resulting in that the vector operation instruction is long.

In addition, although an ASIC for a deep learning field have developed in recent years, this technology is still limited to support the basic vector operation, and a slightly complex vector operation needs to be divided into multiple basic vector operations. For example, for the vector operation y=A*a+b, where a and b are input vector data, y is a vector result, and A is a scalar parameter, the above vector operation needs to be divided into two basic vector operations, i.e., the multiplication operation between a vector and a scalar parameter and the addition operation between vectors.

Therefore, the conventional solution, executed by the computing device, of the vector operation does not support the complex vector operation, and the execution performance of the vector operation is not high, which cannot meet the requirements of deep learning in the field of artificial intelligence.

According to embodiments of the present disclosure, a method, executed by a computing device, for configuring a vector operation is provided. The computing device can support a target vector operation including or consisted of two or more basic vector operations, where parameters of the vector operations are configurable. Further, according to embodiments of the present disclosure, a method, executed by a computing device, of a vector operation is provided. The computing device may read Vector data and execute the vector operation, based on the vector operation that is configured by applying the method for configuring the vector operation of the present disclosure. In this way, flexibility of formats of the vector operation may be improved, while supporting the complex vector operation.

Further, in order to achieve more flexible configuration of the vector operation, according to exemplary embodiments of the present disclosure, the type of the configurable vector operation parameter may be a scalar type or a vector type. In addition, the configurable vector operation parameter may be stored in different storage devices depending on the type of the configurable vector operation parameter. For example, a scalar-typed configurable vector operation parameter may be stored in a scalar memory (such as a register), while a vector-typed configurable vector operation parameter may be stored in a vector memory (such as a storage unit). In this way, different types of configurable vector operation parameters may be stored in different storage devices, such that maintenance and management of configurable vector operation parameter may be reasonable and efficient.

Further, according to exemplary embodiments of the present disclosure, the scalar memory and/or the vector memory may be built into the computing device. For example, the scalar memory and/or the vector memory and the computing device may be integrated on a single chip. In this way, during the configuration of the vector operation unit and the execution of the vector operation, the computing device does not need to read configuration parameters and vector data from an off-chip memory, thereby improving execution performance of the computing device and avoids limited performance caused by bandwidth between the computing device and the external memory.

Figure 1:
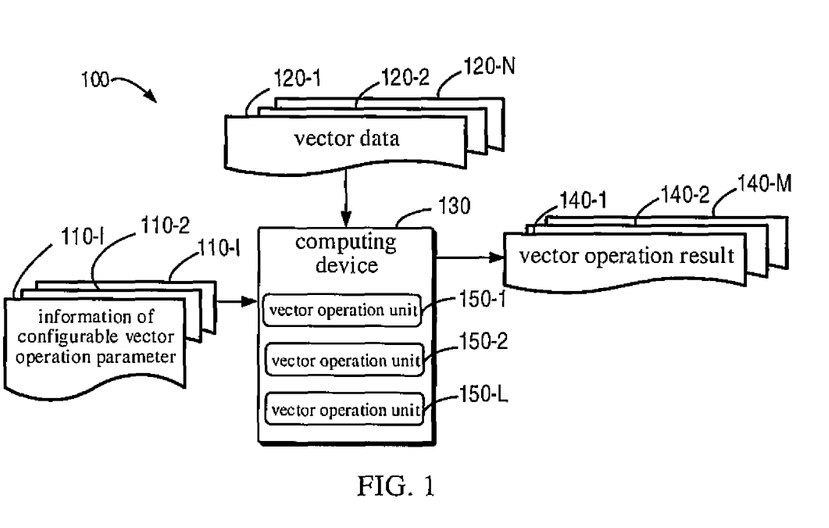
FIG. 1 is a schematic diagram illustrating an exemplary environment of a solution executed by a computing device according to embodiments of the present disclosure.

FIG. 1 is a schematic diagram illustrating an exemplary environment 100 for implementing embodiments of the present disclosure. In the exemplary environment 100, the computing device 130 may obtain information 110-1, 110-2, . . . , 110-I of configurable vector operation parameters. For convenience of description, the information 110-1, 110-2, . . . , 110-I of the configurable vector operation parameters may be collectively referred to as the information 110 of the configurable vector operation parameter. In exemplary embodiments of the present disclosure, the information 110 of the configurable vector operation parameter may indicate the information of each configurable vector operation parameter. For example, the information of the configurable vector operation parameter 110 may indicate the type and value of the configurable vector operation parameter. In exemplary embodiments of the present disclosure, the information 110 of the configurable vector operation parameter may be transmitted to the computing device 130 by means of wired communication or wireless communication. In exemplary embodiments of the present disclosure, the computing device 130 may receive the information 110 of the configurable vector operation parameter input by a user through an input device (including but not limited to, for example, a mouse, a keyboard, a touch pen, a touch screen, and the like) coupled to the computing device 130. In exemplary embodiments of the present disclosure, the computing device 130 may obtain the information 110 of the configurable vector operation parameter by reading a script, a configuration file, or a command file.

The computing device 130 may be a device having computing capabilities. In exemplary embodiments of the present disclosure, the computing device 130 may be a chip having the computing capabilities, including but not limited to a CPU, GPU, and ACTS.

The computing device 130 may include multiple vector operation units 150-1, 150-2, 150-L. For convenience of description, the multiple vector operation units 150-1, 150-2, . . . , 150-L may be collectively referred to as the vector operation unit 150. The vector operation unit 150 may be configured to support the composite vector operation. For example, for the vector operation performed on the vectors a and b, the composite vector operation including configurable vector operation parameters can be defined as y=A*a+B*b+C, where A, B, and C are configurable vector operation parameters. The types and values of the configurable vector operation parameters A, B, and C (which can be scalar-typed or vector-typed) are configurable. In exemplary embodiments of the present disclosure, the composite vector operation may include two or more (more than three) basic vector operations, and the basic vector operations may be arbitrarily combined. It should be understood that the above composite vector operation is merely an example. In some embodiments, the composite vector operation may be defined as having any desired form. In exemplary embodiments of the present disclosure, the vector operation unit 150 may implement or configure the composite vector operation having the configurable vector operation parameters through an integrated electrical component, such as a NAND gate, an amplifier, and the like.

The computing device 130 may configure the multiple vector operation units 150 based on received information 110 of the configurable vector operation parameter such that each vector operation unit of the multiple vector operation units is capable of executing the vector operation defined based on the type and the value of the configurable vector operation parameter. For example, the above-mentioned configurable vector operation parameters A, B, and C can be configured such that A is scalar-typed and has a value of 1, B is scalar-typed and has a value of 2, and C is vector-typed and has a value of [0, . . . 0]. The dimensions (or the number of components) of the configurable vector operation parameter C may be determined from the number of the vector operation units 150 arranged inside the computing device 130, which will be described in detail in the description for FIG. 3. With the above configuration, the composite vector operation y=A*a+B*b+C supported by the vector operation unit 150 and including the configurable vector operation parameters may be determined as a specific vector operation (called as "target vector operation" herein, for convenience of discussion), i.e., y=a+2b.

The computing device 130 may execute the target vector operation. In detail, when performing the vector operation, the computing device 130 obtains vector data 120-1, 120-2, . . . , 120-N to be operated. For convenience of description, the multiple vector data 120-1, 120-2, . . . , 120-N may be collectively referred to as the vector data 120. In exemplary embodiments of the present disclosure, the computing device 130 may obtain the vector data 120 from a database/memory located within the computing device 130 for storing the vector data 120 or a database/memory located outside the computing device 130 for storing the vector data 120. In exemplary embodiments of the present disclosure, the database/memory configured to store the vector data 120 may be a dedicated vector memory, such as an independent or integrated storage unit or the like.

The computing device 130 may acquire information indicating at least one configurable vector operation parameter based on the information 110 of the configurable vector operation parameter, to determine the target vector operation to be executed. After the target vector operation is determined, the computing device 130 may read the vector data 120 to perform the vector operation and output the vector operation results 140-1, 140-2, . . . , 140-M. For convenience of description, the multiple vector operation results 140-1, 140-2, . . . , 140-M may be collectively referred to as the vector operation result 140.

In exemplary embodiments of the present disclosure, the vector operation result may be stored by the computing device 130 in a database/memory for storing the vector operation result 140 located inside the computing device 130 or a database/memory for storing the vector operation result 140 located outside the computing device 130. In exemplary embodiments of the present disclosure, the vector operation result 140 may be stored in the same storage device as the vector data 120.

It should be understood that the configurable vector operation parameters, the vector data, and the numbers of the vector operation units and of the vector operation results are provided as examples only herein. The configurable vector operation parameters, the vector data, and the numbers of the vector operation units and of the vector operation results may vary depending on actual conditions, and the scope of the present disclosure is not limited in this aspect. In addition, the formats of the composite vector operation and of the target vector operation shown herein, as well as the values and types of the configurable vector operation parameters are provided as examples only. The formats of the composite vector operation and of the target vector operation, as well as the values and types of the configurable vector operation parameters may vary depending on actual conditions, and the scope of the present disclosure is not limited in this aspect.

Figure 2:
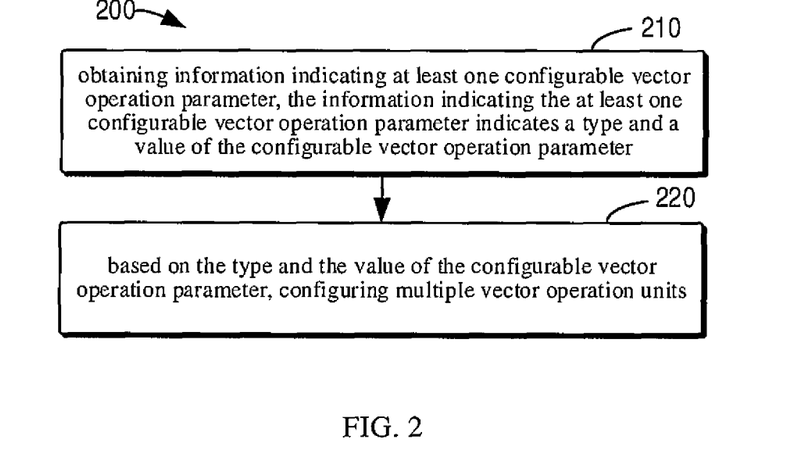
FIG. 2 is a flowchart illustrating a method, executed by a computing device, for configuring vector operation according to exemplary embodiments of the present disclosure.
Figure 3:
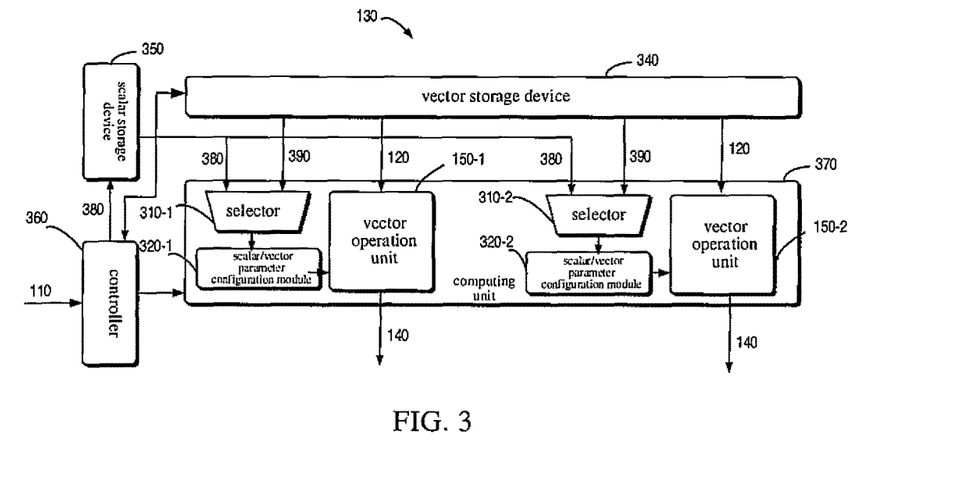
FIG. 3 is a block diagram illustrating a computing device according to exemplar embodiments of the present disclosure.

Hereinafter, the configuration of the vector operation executed by the computing device 130 will be described in more detail in combination with FIG. 2 and FIG. 3. FIG. 2 is a flowchart illustrating the configuration 200 of the vector operation performed by the computing device 130 according to exemplary embodiments of the present disclosure. FIG. 3 is a block diagram illustrating a computing device 130 according to exemplary embodiments of the present disclosure. The configuration 200 may be implemented by the computing device 130 illustrated in FIG. 1. For ease of discussion, the configuration 200 will be described in combination with FIG. 1 and FIG. 3.

In order to discuss the configuration 200 clearly, internal structures of the computing device 130 according to exemplary embodiments of the present disclosure will be briefly described in combination with FIG. 3. As illustrated in FIG. 3, the computing device 130 may include a controller 360, a scalar storage device 350, a vector storage device 340 and a computing unit 370. The controller 360 may be served as a core control module and can interact with a user as an interface of the computing device 130, to obtain the information 110 of the configurable vector operation parameter and other user commands. The controller 360 may be coupled to all of the scalar storage device 350, the vector storage device 340 and the computing unit 370 and control the scalar storage device 350, the vector storage device 340 and the computing unit 370. The scalar storage device 350 may be configured to store the scalar-typed configurable vector operation parameter. In addition, the scalar storage device 350 may also store other control parameters during the vector operation, such as a length of the vector and addresses of inputted and outputted vectors in the storage unit. In exemplary embodiments of the present disclosure, the scalar storage device 350 may be a register. The vector storage device 340 may be configured to store the vector-typed configurable vector operation parameter and the vector data 120. The computing unit 370 may include two parallel vector operation units 150-1 and 150-2 (collectively referred to as the vector operation unit 150), selectors 310-1 and 310 (collectively referred to as the selector 310) corresponding to the vector operation units 150-1 and 150-2 respectively, and scalar/vector parameter configuration modules 320-1 and 320-2 (collectively referred to as the scalar/vector parameter configuration module 320). The selector 310 and the scalar/vector parameter configuration module 320 may obtain the value of the configurable vector operation parameter based on the type of the configurable vector operation parameter, to implement the configuration of the vector operation unit 150.

It should be understood by those skilled in the art that the computing device 130 illustrated in FIG. 3 is for illustration only and is not limitative. Components illustrated in the figure may be increased or decreased as desired, various components may be arbitrarily combined, the number of components can also be increased or decreased as needed, and the scope of the present disclosure is not limited in this aspect.

As illustrated FIG. 2, the configuration 200 of the vector operation executed by the computing device 130 according to the present disclosure may be discussed in detail.

At block 210, the computing device 130 obtains the information 110 indicating at least one configurable vector operation parameter, where the information 110 of the at least one configurable vector operation parameter is associated with the composite vector operation supported by the vector operation unit 150. A case that the vector operation unit 150 supports the composite vector operation $y=A*a+B*b+C$ is taken as an example for illustration. The information 110 of at least one configurable vector operation parameter may indicate the configurable vector operation parameters A, B, and C. It should be understood that depending on the composite vector operation supported by the vector operation unit 150, there may be one or more pieces of information 110 of the configurable vector operation parameter. In addition, the information 110 of the configurable vector operation parameter may be obtained in any manners, including but not limited to, a manner of user input or a manner of reading a script, a configuration file, or a command file. In addition, the obtaining of the information 110 of the configurable vector operation parameter may be implemented through one or more blocks.

In exemplary embodiments of the present disclosure, the information 110 indicating at least one configurable vector operation parameter may be obtained by the controller 360 (as described in FIG. 3) located inside or outside the computing device 130. For example, the controller 360 may receive a user instruction or read a script, a configuration file, or a command to obtain the information 110 of the configurable vector operation parameter after parsing.

In this way, the computing device 130 can support the complex vector operations. In addition, since the vector operation unit 150 of the computing device 130 supports at least one configurable vector operation parameter, multiple target vector operations can be implemented on a separate physical entity, thereby improving generality of the computing device 130. In addition, in this way, the user may perform simple operations and does not need to compile complex vector operation instructions to implement the complex vector operation, thereby reducing complexity of the vector operation.

In exemplary embodiments of the present disclosure, the type of the configurable vector operation parameter may be the scalar type or the vector type. For example, the above-mentioned configurable vector operation parameters A and B may be both configured as the scalar type, and the configurable vector operation parameter C may be configured as the vector type. The acquisition of the scalar-typed parameter and the vector-type parameter may be discussed below respectively.

Scalar Type

In exemplary embodiments of the present disclosure, for the scalar-typed configurable vector operation parameter, the information 110 indicating at least one configurable vector operation parameter may include the value of the configurable vector operation parameter. For example, for the configurable vector operation parameters A and B, the information 110 of the configurable vector operation parameters may indicate $A=1$ and $B=2$.

In exemplary embodiments of the present disclosure, the information 110 indicating at least one configurable vector operation parameter may further include a first indication. The first indication may be configured to indicate that the type of the configuration vector operation parameter is the scalar type. In exemplary embodiments of the present disclosure, the first indication may be explicit. For example, the first indication may be indicted by a 1-bit information. When the value of the 1-bit information is "0", it is indicated that the type of the configurable vector operation parameter is the scalar type. In exemplary embodiments of the present disclosure, the first indication may be implicit. For example, a default type of the configurable vector operation parameter may be the scalar type. As another example, the type of the configurable vector operation parameter may be obtained through a value range of the configurable vector operation parameter. It should be understood that the above examples are merely illustrative and non-restrictive, and the implementation form of the first indication may not be limited thereto, and the scope of the present disclosure is not limited in this aspect.

In exemplary embodiments of the present disclosure, after the information 110 indicating at least one configurable vector operation parameter is obtained, the obtained vector value of the configurable vector operation parameter is stored in the scalar storage device 350 (as illustrated in FIG.

3). For example, in an illustrative example of the present disclosure, after the information (i.e., A=1 and B=2) indicating the configurable vector operation parameters is obtained, the controller 360 may store the values "1" and "2" of the configurable vector operation parameters A and B respectively to the scalar storage device 350.

Vector Type

Before discussing the acquisition of vector-typed configurable vector operation parameter in detail, basic concepts of vector-typed parameter may be briefly introduced. In vector operation for the deep learning, adding a bias is a frequent operation. In this case, the computing device 130 is required to support multiple vector operation units 150 that are executed in parallel, such as the vector operation units 150-1, 150-2, . . . , 150-L as illustrated in FIG. 1 and the vector operation units 150-1 and 150-2 as illustrated in FIG. 3. In exemplary embodiments of the present disclosure, the dimensions (or the number of components) of the vector-typed configurable vector operation parameter may be correspond (or equal) to the number of the vector operation units 150. For example, in a case that the computing device includes two vector operation units 150-1 and 150-1, the configurable vector operation parameter C may be [C1, C2], where C1 may be applied to the vector operation unit 150-1, while C2 may be applied to the vector operation unit 150-2. It should be understood that adding the bias is only an exemplary application scenario, and the application scenario of the vector-typed configurable vector operation parameter is not limited hereto.

In exemplary embodiments of the present disclosure, the vector-typed configurable vector operation parameter may be pre-configured and pre-stored in the vector storage device 340 (as illustrated in FIG. 3). In exemplary embodiments of the present disclosure, the computing device 130 may obtain and store a vector value of the configurable vector operation parameter to the vector storage device 340 and generate storage information (such as storage address) associated with the vector value of the configurable vector operation parameter. It should be understood that the computing device 130 may obtain the vector value of the configurable vector operation parameter in various ways. For example, the vector storage device 340 may read the vector value of the configurable vector operation parameter from an external device through its own input/output interface. As another example, the controller 360 may receive a user input instruction or read a script, a configuration file, or a command file to obtain the vector value of the configurable vector operation parameter. The controller 360 may store the vector value to the vector storage device 340. The scope of the present disclosure is not limited hereto in this aspect.

In exemplary embodiments of the present disclosure, in a case that the configurable vector operation parameter is vector-typed, the information 110 indicating the at least one configurable vector operation parameter may include the storage information. For example, for the configurable vector operation parameter C, the information 110 of the configurable vector operation parameter C may indicate the storage information (such as the storage address & C) of the configurable vector operation parameter C in the vector storage device 340.

In exemplary embodiments of the present disclosure, the information 110 indicating at least one configurable vector operation parameter may include, in addition to the storage information (e.g., &C) of the configurable vector operation parameter, a second indication. The second indication may be configured to indicate that the type of the configuration vector operation parameter is the vector type.

In exemplary embodiments of the present disclosure, the second indication may be explicit, for example, indicated by a 1-bit information. In a case that a value of the 1-bit information is "1", it indicates that the type of the configurable vector operation parameter is the vector type. In exemplary embodiments, the second indication may also be implicit. For example, a default type of the configurable vector operation parameter may be the vector type, or the type of the configurable vector operation parameter may be obtained based on the value of the vector-type configurable operation parameter (such as determining that the value is an address type). It should be understood that the above examples are merely illustrative and non-restrictive, the implementation form of the second indication may not be limited thereto, and the scope of the present disclosure is not limited in this aspect.

The computing device 130 may obtain the vector value based on the storage information of the configurable vector operation parameter in the information 110 of the configurable vector operation parameter. For example, the controller 360 may read the vector value (for example, [C1, C2]) of the configurable vector operation parameter from the vector storage device 340 based on the storage information (for example, &C) of the configurable vector operation parameter.

As illustrated in FIG. 2, at block 220, the computing device 130 configures the multiple vector operation units 150 based on the type and value of the configurable vector operation parameter obtained at block 210. In exemplary embodiments of the present disclosure, during the configuration of the vector operation unit 150, the selector 310 (as described in FIG. 3) may obtain the configurable vector operation parameter from the scalar storage device 350 or from the vector storage device 340 respectively based on the type of the configurable vector operation parameter. In detail, when the configurable vector operation parameter is scalar-typed, the selector 310 may obtain the value of the configurable vector operation parameter from the scalar storage device 350, for example, reading A=1 and B=2 from the scalar storage device 350. When the vector operation parameter is scalar-typed, the selector 310 may obtain the vector value of the configurable vector operation parameter from the vector storage device 340, for example, reading C=[C1, C2] from the vector storage device 340. In exemplary embodiments of the present disclosure, the selectors 310-1 and 310-2 may each include multiple parameter selectors. The number of parameter selectors may correspond (or equal) to the number of the configurable vector operation parameters of the composite vector operation supported by the vector operation unit 150. For example, for the composite vector operation y=A*a+B*b+C, the selectors 310-1 and 310-2 may each have three parameter selectors. The three parameter selectors may correspond to the configurable vector operation parameters A, B and C, to obtain the values of the configurable vector operation parameters A, B, and C.

In exemplary embodiments of the present disclosure, the obtained values of the vector operation parameters A, B, and C may be applied to the vector operation unit by the scalar/vector parameter configuration module 320.

In exemplary embodiments of the present disclosure, the scalar-typed configurable vector operation parameter may be applied to each of the multiple vector operation units 150, while values of different components of the vector-typed configurable vector operation parameter may be applied to each of the vector operation units 150.

Referring to the exemplary embodiment where the composite vector operation is y=A*a+B*b+C, for example, the configurable vector operation parameter A is scalar-typed and the value of A is "1", the configurable vector operation parameter B is scalar-typed and the value of B is "2", and the configurable vector operation parameter C is vector-typed and the value of C is "[C1, C2]", where C1 and C2 are constants. The target vector operation corresponding to the vector operation unit 150-1 may be y=a+2b+C1, while the target vector operation corresponding to the vector operation unit 150-2 may be y=a+2b+C2.

From above, the computing device 130 can implement the complex vector operations and the user can perform simple configuration to flexibly implement multiple vector operation formats on a single hardware device.

Figure 4:
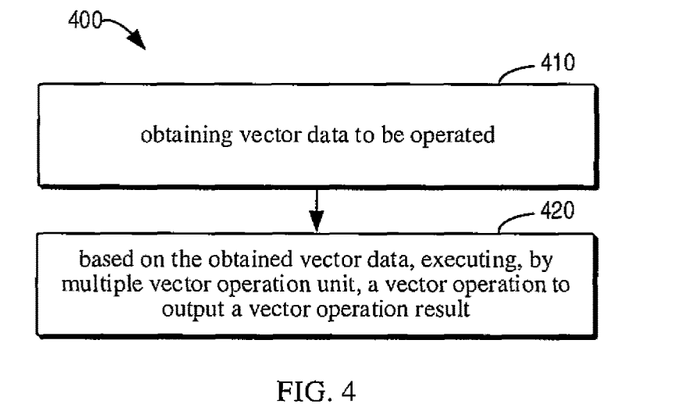
FIG. 4 is a flowchart illustrating a method, executed by a computing device, of vector operation according to exemplary embodiments of the present disclosure.

Hereinafter, the execution of the vector operation executed by the computing device 130 may be described in detail with reference to FIG. 4. FIG. 4 is a flowchart illustrating the execution of the vector operation executed by the computing device 130 according to exemplary embodiments of the present disclosure. The execution 400 may be implemented by the computing device 130 as illustrated in FIG. 1. For ease of discussion, the execution 400 may be described in combination with FIG. 1 and FIG. 3.

At block 410, the computing device 130 may obtain the vector data 120 to be operated. In exemplary embodiments, the vector data 120 to be operated may be cached in the vector storage device 340 in advance. In this case, the computing device 130 does not need to interact with the external storage device when performing the vector operation, thereby avoiding limited performance caused by the bandwidth between the computing device 130 and the external device, and improving the performance of the vector operation.

At block 420, the computing device 130 performs the vector operation based on the acquired vector data 120 to output the vector operation result 140. For example, as illustrated in FIG. 3, the vector operation unit 150 reads the vector data 120 from the vector storage device 340 and performs the vector operation. The vector operation executed by the vector operation unit 150 may be performed by any method for configuring the vector operation executed by the computing device according to the present disclosure.

Those skilled in the art should understand that the operation of performing the vector operation and the operation of configuring the vector operation may be triggered separately or together. For example, in exemplary embodiments of the present disclosure, the operation of executing the vector operation and the operation of configuring the vector operation may be triggered by different user instructions. In exemplary embodiments, the operation of executing the vector operation and the operation of configurating the vector operation may be triggered by the same user instruction, or the execution of the vector operation may be automatically triggered after configuring the vector operation, the scope of the present disclosure is not limited in this aspect.

Figure 5:
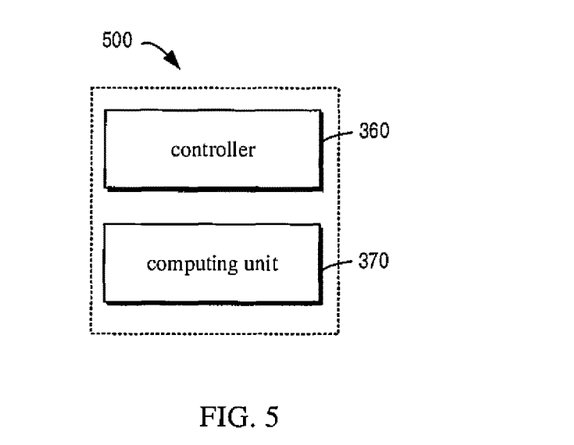
FIG. 5 is a block diagram illustrating an apparatus, executed by a computing device, for configuring vector operation according to embodiments of the present disclosure.

In the above manner, performance of the vector operation can be improved while configuring the vector operation flexibly. FIG. 5 is a block diagram illustrating an apparatus for configuring the vector operation executed by a computing device according to embodiments of the present disclosure. The apparatus 500 may be included in or implemented as the computing device 130 as illustrated in FIG. 1. As illustrated in FIG. 5, the device 500 may include a controller 360 configured to obtain information 110 indicating at least one configurable vector operation parameter. The information 110 of at least one configurable vector operation parameter may indicate the type and value of the configurable vector operation parameter. The apparatus 500 may include a computing unit 370. The computing unit 370 may include multiple vector operation units 150. The computing unit 370 is configured to configure the multiple vector operation units based on the type and value of the configurable vector operation parameter to enable each of the vector operation units to execute the target vector operation including two or more basic vector operations and defined based on the type and value of the configurable vector operation parameter.

In exemplary embodiments of the present disclosure, the type of the configurable vector operation parameter may include a scalar type and a vector type.

In exemplary embodiments of the present disclosure, the information 110 indicating the at least one configurable vector operation parameter may include: an explicit or implicit first indication and a value of the configurable vector operation parameter. The first indication is configured to indicate that the type of the configuration vector operation parameter is the scalar type.

In exemplary embodiments of the present disclosure, the apparatus 500 may further include a scalar storage device 350. The scalar storage device 350 may be configured to store the value of the configurable vector operation parameter. The controller may be configured to obtain and store the value of the configurable vector operation parameter to the scalar storage device 350.

In exemplary embodiments of the present disclosure, the computing unit 520 may further includes a selector 310 and a scalar parameter configuration module 320. The selector 310 may be configured to obtain the value of the configurable vector operation parameter. The scalar parameter configuration module 320 may be configured to apply the value of the configurable vector operation parameter obtained by the selector 310 to each of the multiple vector operation units.

In exemplary embodiments of the present disclosure, the apparatus 500 may further include a vector storage device 340 and a vector parameter acquisition module. The vector storage device 340 may be configured to store a vector value of the configurable vector operation parameter. The vector parameter acquisition module may be configured to obtain and store the vector value of the configurable vector operation parameter to the vector storage device 340 and generate storage information of the vector value of the configurable vector operation parameter. The information 110 indicating the at least one configurable vector operation parameter includes the storage information.

In exemplary embodiments of the present disclosure, dimensions of the vector value (or the number of vector values) of the configurable vector operation parameter corresponds to a number of the multiple vector operation units.

In exemplary embodiments of the present disclosure, the information 110 indicating the configurable vector operation parameter may further include an explicit or implicit second indication. The second indication is configured to indicate that the type of the configuration vector operation parameter is the vector type.

In exemplary embodiments of the present disclosure, the controller may be configured to obtain the storage information of the configuration vector operation parameter. The computing unit may include a selector 310 and a vector parameter configuration module 320. The selector 310 may be configured to obtain the vector value of the configurable vector operation parameter based on the storage information of the configuration vector operation parameter. The vector parameter configuration module 320 may be configured to apply the vector values of different components (or different dimension) of the configurable vector operation parameter obtained by the selector 310 to respective vector operation units of the multiple vector operation units respectively.

Figure 6:
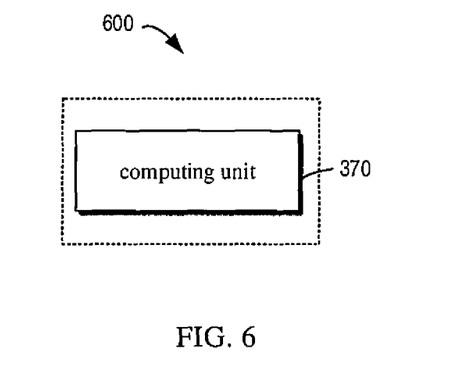
FIG. 6 is a block diagram illustrating an apparatus, executed by a computing device, of vector operation according to embodiments of the present disclosure.

FIG. 6 is a block diagram illustrating an apparatus 600 of the vector operation executed by a computing device according to embodiments of the present disclosure. The apparatus 600 can be included in the computing device 130 as illustrated in FIG. 1 or implemented as the computing device 130. As illustrated in FIG. 6, the apparatus 600 may include a computing unit 370. The computing unit 370 includes multiple vector operation units. The computing unit may be configured to obtain vector data to be operated, and execute the vector operation by the multiple vector operation units based on the obtained vector data, to output a vector operation result. The vector operation is configured according to the method for configuring the vector operation as described above.

In exemplary embodiments of the present disclosure, the apparatus 600 may further include a vector storage device 340 and a vector data acquisition module. The vector storage device 340 may be configured to store the vector data to be operated. The vector data acquisition module may be configured to cache the vector data in the vector storage device.

Figure 7:
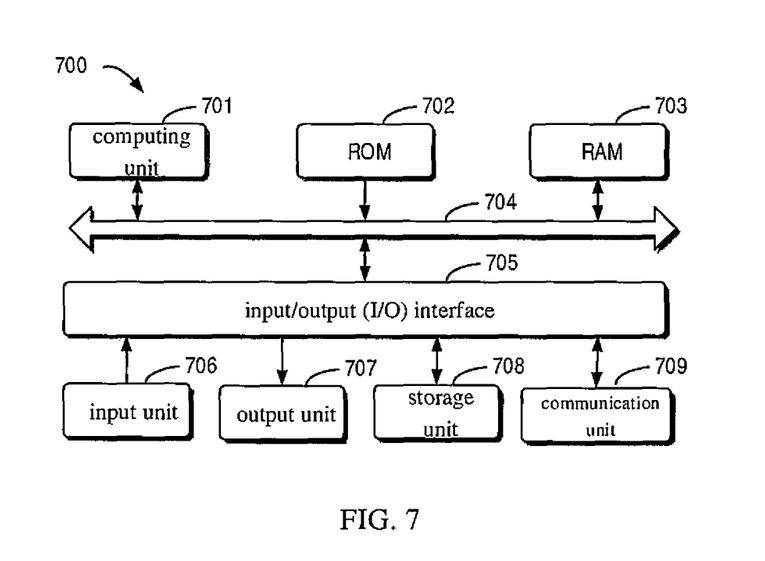
FIG. 7 is a block diagram illustrating a computing device capable of implementing embodiments of the present disclosure.

FIG. 7 is a block diagram illustrating an exemplary device 700 for implementing embodiments of the present disclosure. The device 700 may be configured to implement the computing device 130 of FIG. 1. As illustrated in FIG. 7, the device 700 may include a computing unit 701. The computing unit 710 may be configured to execute various appropriate actions and processes based on computer program instructions stored in a read-only memory (ROM) 702 or computer program instructions loaded from a storage unit 708 into a random access memory (RAM) 703. In the RAM 703, various programs and data necessary for the operation of the device 700 can also be stored. The computing unit 701, the ROM 702, and the RAM 703 are coupled to each other through a bus 704. An input/output (I/O) interface 705 is also coupled to the bus 704.

Components in the device 700 are connected to the I/O interface 705, including: an input unit 706, such as a keyboard, a mouse; an output unit 707, such as various types of displays, speakers; a storage unit 708, such as a disk, an optical disk; and a communication unit 709, such as network cards, modems, wireless communication transceivers, and the like. The communication unit 709 allows the device 700 to exchange information/data with other devices through a computer network such as the Internet and/or various telecommunication networks.

The computing unit 701 may be various general-purpose and/or special-purpose processing components having processing and computing capabilities. Some examples of the computing unit 701 include, but are not limited to, a central processing unit (CPU), a graphics processing unit (GPU), various specialized artificial intelligence (AI) computing chips, various computing units running machine learning model algorithms, and digital signal processor (DSP), and any suitable processor, controller, microcontroller, etc. The computing unit 701 performs various methods and processes described above, such as the process 200. For example, in some embodiments, the process 200 may be implemented as computer software programs that are tangibly embodied on a machine-readable medium, such as the storage unit 708. In some embodiments, part or all of the computer program may be loaded and/or installed on the device 700 via the ROM 702 and/or the communication unit 709. When a computer program is loaded into the RAM 703 and executed by the computing unit 701, one or more steps of the process 200 described above may be performed. Alternatively, in other embodiments, the computing unit 701 may be configured to perform the process 200 in any other suitable manner (e.g., by means of firmware).

The functions described above herein may be performed, at least in part, by one or more hardware logic components. For example, unlimitedly, exemplary types of hardware logic components that may be used include: Field Programmable Gate Arrays (FPGAs), Application Specific Integrated Circuits (ASICs), Application Specific Standard Products (ASSPs), System on Chip (SOCs), Load programmable logic devices (CPLDs) and so on.

Program code for implementing the methods of the present disclosure may be written in any combination of one or more programming languages. These program codes may be provided to a processor or controller of a general computer, a dedicated computer, or other programmable data processing device, such that the program codes, when executed by the processor or controller, cause the functions and/or operations specified in the flowcharts and/or block diagrams is performed. The program code can be executed entirely on the machine, partly on the machine, as a stand-alone software package partly on a machine and partly on a remote machine or entirely on a remote machine or server.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), erasable programmable read-only memories (EPROM or flash memory), fiber optics, compact disc read-only memories (CD-ROM), optical storage devices, magnetic storage devices, or any suitable combination of the foregoing.

In addition, although the operations are depicted in a particular order, this should be understood as requiring that such operations be performed in the shown particular order or in sequential order, or that all illustrated operations be performed to achieve the desired result. Under certain circumstances, multitasking and parallel processing may be advantageous. Likewise, although several specific implementation details are included in the discussion above, these should not be construed as limiting the scope of the disclosure. Certain features that are described in the context of separate embodiments can also be implemented in combination in a single implementation. Conversely, various features that are described in the context of a single implementation can also be implemented in multiple implementations individually or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely example forms for implementing the claims.

What is claimed is:

1. A method, executed by a computing device, for configuring a vector operation, comprising:
   obtaining information indicating at least one configurable vector operation parameter, wherein the information indicating the at least one configurable vector operation parameter is configured to indicate a type and a value of the configurable vector operation parameter; and
   based on the type and the value of the configurable vector operation parameter, configuring a plurality of vector operation circuits to enable each of the vector operation circuits to execute a target vector operation, wherein the target vector operation comprises two or more basic vector operations and defined based on the type and the value of the configurable vector operation parameter;
   wherein when the type of the configurable vector operation parameter is a scalar type, a scalar value of the configurable vector operation parameter is applied to each of the plurality of the vector operation units, and when the type of the configurable vector operation parameter is a vector type, vector values of different components of the configurable vector operation parameter is applied to respective vector operation units of the plurality of the vector operation units.

2. The method according to claim 1, wherein the information indicating the at least one configurable vector operation parameter comprises:
   an explicit or implicit first indication, indicating that the type of the configuration vector operation parameter is the scalar type; and
   a scalar value of the configurable vector operation parameter.

3. The method according to claim 2, wherein obtaining the information indicating the at least one configurable vector operation parameter comprises:
   obtaining the scalar value of the configurable vector operation parameter; and
   storing the scalar value of the configurable vector operation parameter to a scalar storage device.

4. The method according to claim 2, wherein configuring the plurality of vector operation circuits based on the type and value of the configurable vector operation parameter comprises:
   obtaining, by a selector, the scalar value of the configurable vector operation parameter; and
   applying the scalar value of the configurable vector operation parameter to each of the plurality of the vector operation circuits.

5. The method according to claim 1, further comprising:
   obtaining a vector value of the configurable vector operation parameter;
   storing the vector value of the configurable vector operation parameter to a vector storage device; and
   generating storage information of the vector value of the configurable vector operation parameter, wherein the information indicating the at least one configurable vector operation parameter comprises the storage information.

6. The method according to claim 5, wherein the number of vector values of the configurable vector operation parameter corresponds to the number of the plurality of the vector operation circuits.

7. The method according to claim 5, wherein the information indicating the configurable vector operation parameter further comprises:
   an explicit or implicit second indication, indicating that the type of the configuration vector operation parameter is the vector type.

8. The method according to claim 5, wherein configuring the plurality of vector operation circuits based on the type and value of the configurable vector operation parameter comprises:
   obtaining the storage information of the configuration vector operation parameter;
   obtaining, by a selector, the vector value of the configurable vector operation parameter based on the storage information of the configuration vector operation parameter; and
   applying the vector value of different component of the configurable vector operation parameter to respective vector operation circuits of the plurality of the vector operation circuits.

9. An electronic device, comprising:
   one or more processors; and
   a storage device, configured to store one or more programs, wherein when the one or more programs are executed by the one or more processors, the one or more processors are caused to:
   obtain information indicating at least one configurable vector operation parameter, wherein the information indicating the at least one configurable vector operation parameter is configured to indicate a type and a value of the configurable vector operation parameter; and
   based on the type and the value of the configurable vector operation parameter, configure a plurality of vector operation circuits to enable each of the vector operation circuits to execute a target vector operation, wherein the target vector operation comprises two or more basic vector operations and defined based on the type and the value of the configurable vector operation parameter;
   wherein when the type of the configurable vector operation parameter is a scalar type, a scalar value of the configurable vector operation parameter is applied to each of the plurality of the vector operation units, and when the type of the configurable vector operation parameter is a vector type, vector values of different components of the configurable vector operation parameter is applied to respective vector operation units of the plurality of the vector operation units.

10. The electronic device according to claim 9, wherein the information indicating the at least one configurable vector operation parameter comprises:
    an explicit or implicit first indication, indicating that the type of the configuration vector operation parameter is the scalar type; and
    a scalar value of the configurable vector operation parameter.

11. The electronic device according to claim 10, wherein the one or more processors are caused to obtain the information indicating the at least one configurable vector operation parameter by:
    obtaining the scalar value of the configurable vector operation parameter; and
    storing the scalar value of the configurable vector operation parameter to a scalar storage device.

12. The electronic device according to claim 10, wherein the one or more processors are caused to configure the plurality of vector operation circuits based on the type and value of the configurable vector operation parameter by:
    obtaining, by a selector, the scalar value of the configurable vector operation parameter; and applying the scalar value of the configurable vector operation parameter to each of the plurality of the vector operation circuits.

13. The electronic device according to claim 9, wherein the one or more processors are caused to:
   obtain a vector value of the configurable vector operation parameter;
   store the vector value of the configurable vector operation parameter to a vector storage device; and
   generate storage information of the vector value of the configurable vector operation parameter, wherein the information indicating the at least one configurable vector operation parameter comprises the storage information.

14. The electronic device according to claim 13, wherein the number of vector values of the configurable vector operation parameter corresponds to the number of the plurality of the vector operation circuits.

15. The electronic device according to claim 13, wherein the information indicating the configurable vector operation parameter further comprises:
   an explicit or implicit second indication, indicating that the type of the configuration vector operation parameter is the vector type.

16. The electronic device according to claim 13, wherein the one or more processors are caused to configure the plurality of vector operation circuits based on the type and value of the configurable vector operation parameter by:
   obtaining the storage information of the configuration vector operation parameter;
   obtaining, by a selector, the vector value of the configurable vector operation parameter based on the storage information of the configuration vector operation parameter; and
   applying the vector value of different component of the configurable vector operation parameter to respective vector operation circuits of the plurality of the vector operation circuits.

17. A non-transitory computer-readable storage medium, having a computer program stored thereon, wherein when the program is executed by a processor, a method for configuring a vector operation is implemented, the method comprises:
   obtaining information indicating at least one configurable vector operation parameter, wherein the information indicating the at least one configurable vector operation parameter is configured to indicate a type and a value of the configurable vector operation parameter; and
   based on the type and the value of the configurable vector operation parameter, configuring a plurality of vector operation circuits to enable each of the vector operation circuits to execute a target vector operation, wherein the target vector operation comprises two or more basic vector operations and defined based on the type and the value of the configurable vector operation parameter;
   wherein when the type of the configurable vector operation parameter is a scalar type, a scalar value of the configurable vector operation parameter is applied to each of the plurality of the vector operation units, and when the type of the configurable vector operation parameter is a vector type, vector values of different components of the configurable vector operation parameter is applied to respective vector operation units of the plurality of the vector operation units.

18. The non-transitory computer-readable storage medium according to claim 17, wherein the method further comprises:
   in response to detecting that the information indicating the at least one configurable vector operation parameter comprises an explicit or implicit first indication, obtaining a scalar value of the configurable vector operation parameter and storing the scalar value of the configurable vector operation parameter to a scalar storage device; and
   in response to detecting that the information indicating the at least one configurable vector operation parameter comprises an explicit or implicit second indication, obtaining a vector value of the configurable vector operation parameter; storing the vector value of the configurable vector operation parameter to a vector storage device; and generating storage information of the vector value of the configurable vector operation parameter,
   wherein the first indication is configured to indicate a scalar type and the second indication is configured to indicate a vector type.

\* \* \* \* \*